Feb. 17, 1942. W. W. LOWTHER ET AL 2,273,210
DEVICE FOR DETACHABLY CLAMPING CYLINDRICAL SECTIONS TOGETHER
Filed July 22, 1940 3 Sheets-Sheet 1
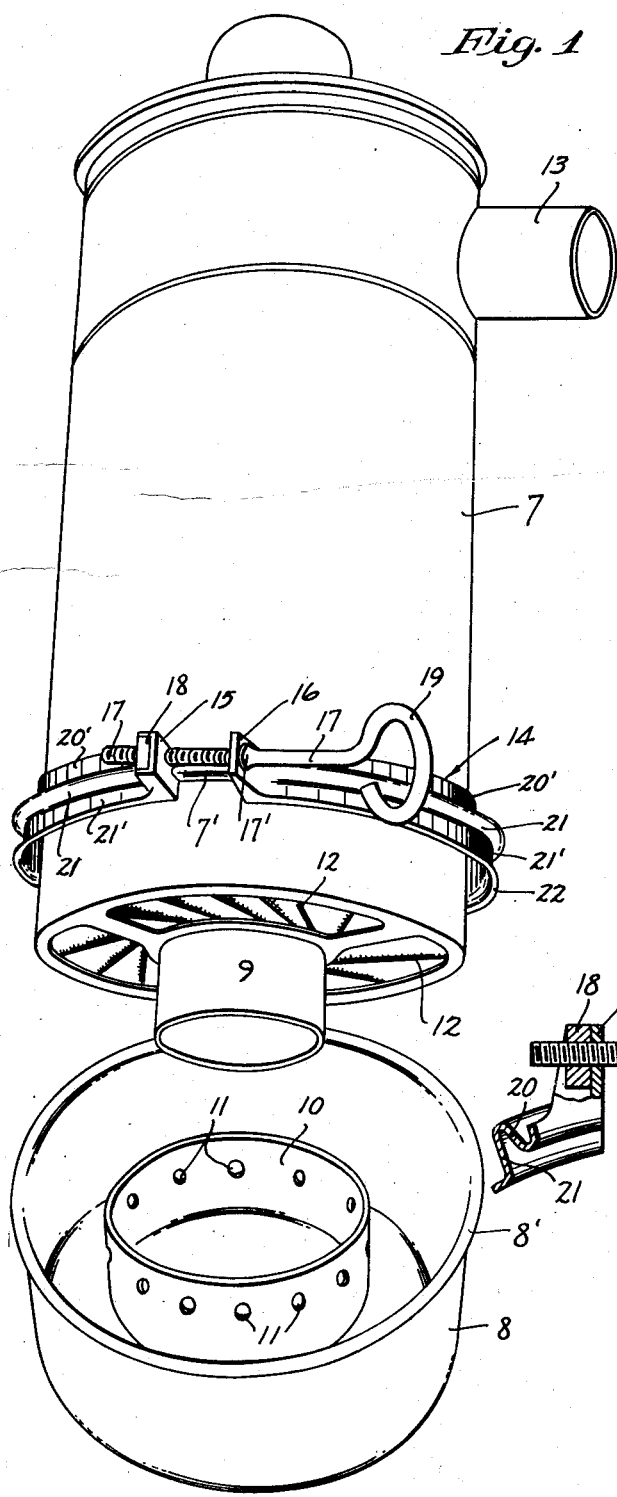
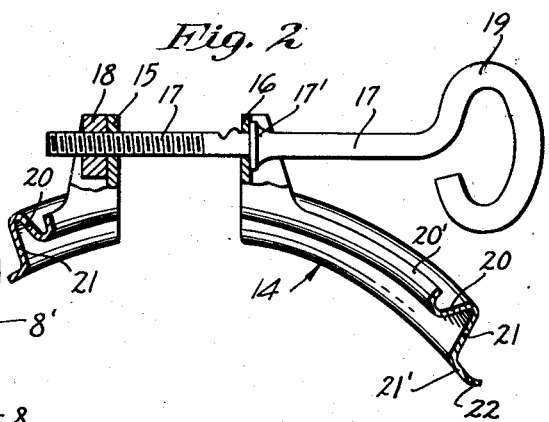
Inventors
Wilfred W. Lowther
Fred R. Nohavec
By their Attorneys
Merchant & Merchant Feb. 17, 1942. W. W. LOWTHER ET AL 2,273,210
DEVICE FOR DETACHABLY CLAMPING CYLINDRICAL SECTIONS TOGETHER
Filed July 22, 1940 3 Sheets-Sheet 2
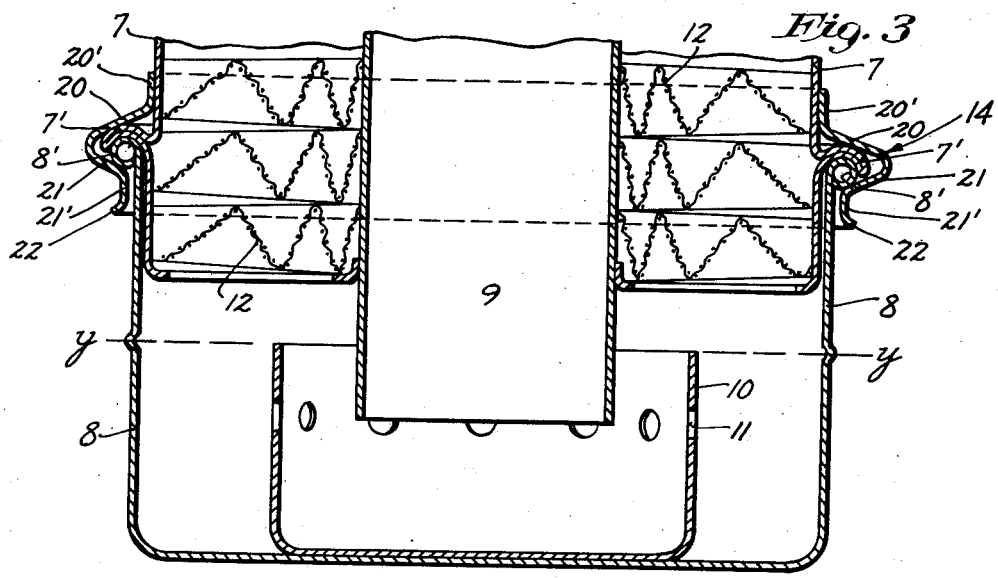
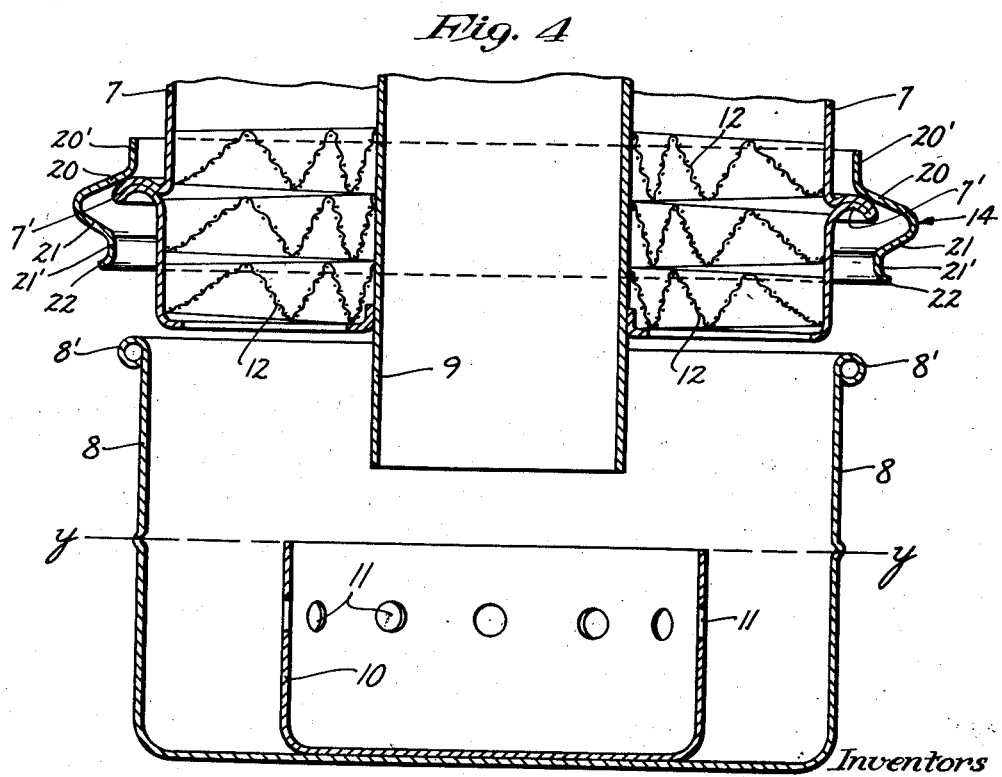
Inventors
Wilfred W. Lowther
Fred R. Nohavec
By their Attorneys Feb. 17, 1942.  W. W. LOWTHER ET AL  2,273,210
DEVICE FOR DETACHABLY CLAMPING CYLINDRICAL SECTIONS TOGETHER
Filed July 22, 1940  3 Sheets-Sheet 3

Inventors
Wilfred W. Lowther
Fred R. Nohavec
By their Attorneys

Patented Feb. 17, 1942

2,273,210

UNITED STATES PATENT OFFICE 2,273,210

DEVICE FOR DETACHABLY CLAMPING CYLINDRICAL SECTIONS TOGETHER

Wilfred W. Lowther and Fred R. Nohavec, St. Paul, Minn., assignors, by direct and mesne assignments, of twenty-five per cent to Ruth C. Donaldson, twenty per cent to Robert H. Donaldson, twelve and one-half per cent to A. Donaldson Olin, six and one-fourth per cent to Mae D. Buckeye, six and one-fourth per cent to Ralph A. Buckeye, five per cent to Margaret M. Donaldson, and twenty-five per cent to Ruth C. Donaldson as trustee Application July 22, 1940, Serial No. 346,798

4 Claims. (Cl. 285—129)

Our present invention relates to improvements and devices for detachably clamping together cylindrical sections or elements, and while capable of a broad range of uses, the invention is particularly adaptable for use in connection with fluid bath-type air cleaners to detachably anchor the cylindrical oil wells thereof to the cylindrical bodies of the air cleaners.

In a more specific sense it may be said that the invention provides improvements in clamping devices of the general character involving the split type of clamping band.

In the drawings hereof a preferred embodiment of the invention is illustrated in connection with an air cleaner of the character disclosed and claimed in Letters Patent of the United States 2,072,548 of March 2, 1937, to Frank A. Donaldson. The air cleaner illustrated is of the before-mentioned fluid bath type that is used primarily in connection with internal combustion engine air intakes and includes an upper or main cylindrical body section and a detachable auxiliary or lower cylindrical section that is closed at its bottom and serves as an oil well. The upper and lower cylindrical sections of the air cleaner are provided with cooperating outstanding annular coupling flanges that are detachably but firmly clamped together by a cross-sectionally channel-shaped clamping band of the present invention. In accordance with the invention the clamping band and cooperating coupling flanges are so constructed, arranged and proportioned that the clamping band, which normally embraces the cooperating coupling flanges, will remain locked against axial displacement from one of the coupling flanges when loosened and expanded radially sufficiently to permit removal of one of the coupling flanges from the confines of the channel-shaped clamping band.

In the specific example illustrated herein the arrangement is preferably such that the clamping band will remain locked on the coupling flange of the upper or main cylindrical section of the cleaner when loosened sufficiently to permit removal of the coupling flange of the oil well, removal of the oil well being necessary at frequent intervals for the purpose of servicing the cleaner.

Also in the specific example herein illustrated it is important to note that one of the inwardly diverging flanges of the clamping band will come into engagement with its adjacent cylindrical section while the other inwardly diverging flange thereof is well spaced from its radially adjacent shell section so that under continued clamping action of the clamping band the band will be placed under a torque strain which will tend to warp the same out of the normally flat plane with the result that a further yielding clamping pressure in an axial direction will be exerted by the band on the cooperating coupling flanges.

The above and other objects and advantages of our present invention will be made clear from the following specification, claims and appended drawings. In the accompanying drawings like characters indicate like parts throughout the several views.

Referring to the drawings:

Fig. 1 is a perspective view of the air cleaner with the oil well thereof removed as for servicing;

Fig. 2 is a fragmentary view in side elevation, with some parts broken away, showing the adjacent ends of the split clamping band on an enlarged scale;

Fig. 3 is a fragmentary view in axial section showing the oil well applied to the main cylindrical casing section of the air cleaner and detachably connected thereto by one of the improved clamping bands of the invention;

Fig. 4 is a view corresponding to Fig. 3 but showing the clamping band loosened and the oil well removed from its operative position;

Figure 5:
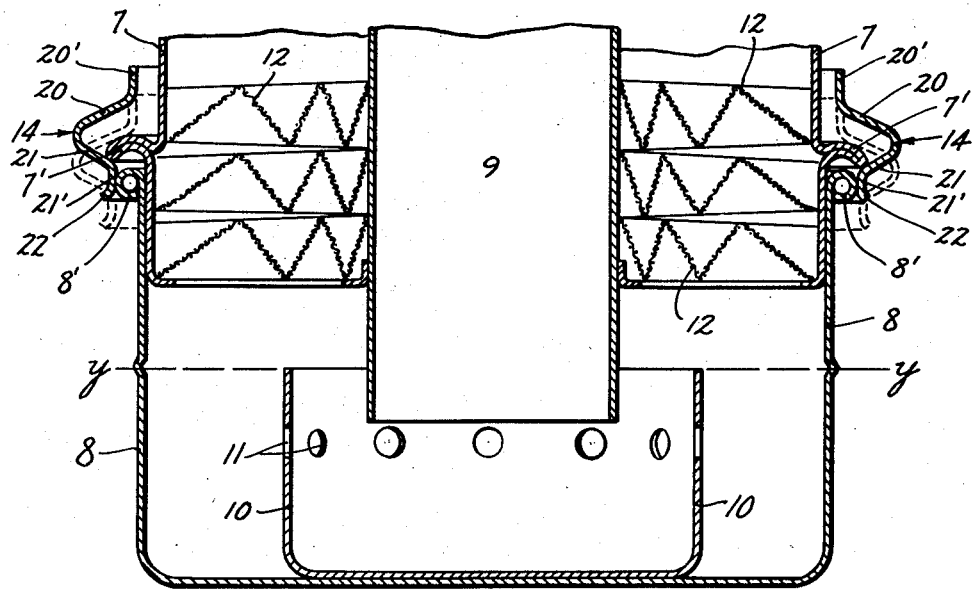
Fig. 5 is a view similar to Figs. 3 and 4 but illustrating other positions of the parts.

Since we have herein shown a preferred embodiment of the invention applied to an air cleaner of the type disclosed in the before-mentioned Donaldson patent, a brief description thereof is in order and is as follows.

The casing of the cleaner is in the nature of a cylindrical shell of sheet metal and which is made up mainly of an upper or main cylindrical section 7 and an auxiliary or lower cylindrical section 8, which latter section is in the nature of a closed bottom oil well of cup-like appearance. An air intake tube 9 extends axially through the cylindrical casing and terminates with its lower end within the oil well-forming lower shell section 8 and below the normal static oil or fluid level therein indicated by broken line y—y. In fact, the air intake tube terminates within an inner oil cup 10 that is seated on the bottom of the oil well-forming lower section 8 and is provided with air and oil metering passages or ports 11 intermediate its upper and lower edges. The annular space between the upper shell section 7 and the air intake tube 9 is provided with a vertically stacked series of oil intercepting devices in the nature of wire screens 12. Near the top of the main or upper shell section 7 is a radially extended air outlet tube 13 that opens into the upper portion of the last-mentioned annular space. The cup-shaped oil well section 8 is telescoped on to the lower portion of the shell section 7 to the limit established by engagement of a rolled or beaded upper edge 8', which latter forms a coupling flange for the oil well, with a cooperating outstanding annular coupling flange 7' of the shell section 7. The coupling flange 7', as shown, is of slightly greater diameter than the coupling flange 8' and is concave so as to partially receive but project radially outwardly of the coupling flange 8'. Preferably the coupling flange 7' is formed by spinning and outwardly expanding a portion of the shell section 7 and then pressing the same together to form a closed fold.

The clamping band, which operates as a coupling band or element, is, in its preferred form, herein illustrated in the nature of a sheet metal band 14 that is split circumferentially and provided at its opposite ends with outstanding coupling lugs 15 and 16 that are formed by outwardly turning the ends of the split band. For the purpose of contracting the band, a screw-threaded rod 17 is extended through the lugs 15 and 16 and has threaded engagement with a nut 18 that is loosely seated against the lug 15 but is held against rotation by socket-forming flanges 15' of the lug 15. The intermediate portion of the screw-threaded rod 17 is provided with a stop flange 17' that engages the band lug 16 and at its extreme outer end, beyond the flange 17', the rod 17 is provided with a loop-shaped hand piece 19.

In cross section the clamping band is bent to form a transversely V-shaped annular channel composed of upper and lower inwardly diverging channel flanges 20 and 21 respectively. The flange 20 is turned outwardly parallel to the axis of the casing to provide a rim flange 20', and the channel flange 21 is similarly turned to provide an axially extended rim flange 21'. As will hereinafter be seen, the rim flange 20' serves as an abutment flange, whereas the annular flange 21' serves as an annular guide for the coupling flange 8' when moving the oil well into operative position. Since the rim flange 21' is to serve as a guide flange, its extreme edge portion is preferably outwardly flared as at 22.

Figure 6:
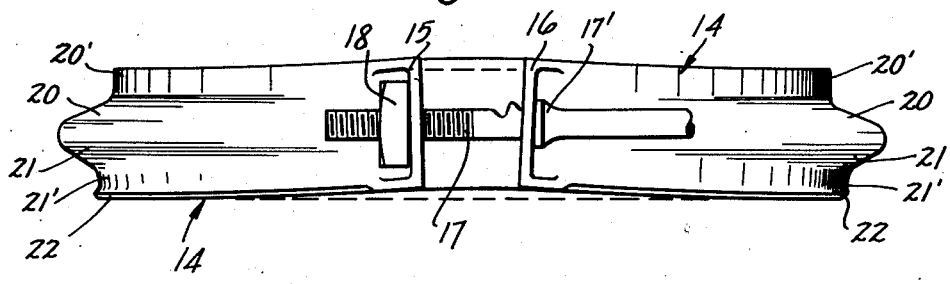
Fig. 6 is a view in side elevation of the clamping band made for the purpose of illustrating the shape the clamping band tends to assume under final tightening action in an operative position on the cleaner.

As will be evident from an examination of the structure, the coupling flanges 7' and 8' are received within the channel formed by the channel flanges 20 and 21, so that, under initial contraction of the band by means of the clamping screw, the clamping band will exert a wedging action on the coupling flanges that will tend to draw the same together axially. Upon continued clamping action of the band on the coupling flanges, the abutment flange 20' will engage the cylindrical section 7 and will be stopped against further radial contraction, while the guide flange 21' of the band is still well spaced from the cylindrical section 8. This engagement of the abutment flange 20' with the cylindrical section 7, while setting up considerable resistance to further clamping action of the band, does not, nevertheless, prevent further turning up of the clamping screw. In fact, still further turning up of the clamping screw is recommended and results in placing the clamping band under a torque strain which tends to warp the clamping band out of a normally flat plane. Of course, this tendency to warp the clamping band out of a flat plane by further turning up the clamping screw after the upper edge of the clamping band has been stopped against radial contraction, is largely resisted by the relatively tight fit of the clamping band on the coupling flanges 7' and 8', but the tendency, nevertheless, is to warp the band toward the condition indicated in Fig. 6 wherein it will be noted that the front and rear portions of the band have been warped upwardly with respect to the sides of the band. This tendency to warp the band is important in that it produces a further resilient axial clamping pressure between the coupling flanges 7' and 8' and adds a degree of elasticity to the clamping action which is not otherwise obtained. This elasticity of clamping action substantially eliminates any possibility of the clamp coming loose under continuous vibrations such as encountered in connection with tractor air cleaners and the like.

It is important to note that the clamping band may be loosened sufficiently to permit removal of the lower cylindrical section 8 without releasing the channel of the clamping band from interlocking engagement with the coupling flange 7' of the section 7, and this is shown in greatest clarity in Fig. 5. By particular reference to Fig. 5, it will be seen that whereas the band has been opened up sufficiently to permit passage of the coupling flange 8' through the axial opening in the band flanges 21 and 21', that the channel of the clamping band is still interlocked over the coupling flange 7' against axial displacement therefrom in either direction. This permits quick removal of the oil well-forming lower section 8 of the cleaner for servicing without any care being given to the handling of the clamping band and without any danger of loss thereof, and upon replacement of the oil well-forming lower section, the clamping band is always in its proper position. Since the clamping band is of resilient character, it may be slightly out of round and set up some frictional resistance to reinsertion of the coupling flange 8' through the guide flange 21' of the clamp, but such resistance will only result in limited upward movement of the clamping band to the position shown by full lines in Fig. 5, and immediately upon passage of the coupling flange 8' through the guide flange 21', the clamping band will drop back to its normal position shown by dotted lines in Fig. 5.

What we claim is:

1. In combination, a pair of axially aligned cylindrical sections provided with cooperating outstanding annular coupling flanges, and a cross-sectionally channel-shaped split clamping band comprising inwardly diverging annular band flanges forming opposite sides of a common channel and engaging opposite of said annular coupling flanges with a clamping action tending to draw the same together, the coupling flange of one of said sections being of greater diameter than the coupling flange of the other section, and the axial opening through the band flange that engages the smallest diameter coupling flange being of greater diameter than the axial opening through the other of said band flanges, whereby the clamping band will remain locked against axial displacement in either direction from the larger diameter coupling flange when said band is opened sufficiently to permit axial displacement of the smaller diameter coupling flange from the channel of the clamping band.

2. In combination, a pair of axially aligned cylindrical sections provided with cooperating outstanding annular coupling flanges, and a cross-sectionally channel-shaped split clamping band comprised of inwardly diverging annular band flanges forming opposite sides of a common channel and engaging opposite of said annular coupling flanges with a clamping action tending to draw the same together, the relation of the band flanges to their respective radially adjacent shell sections being such that, under clamping action of the band on the coupling flanges, one of the band flanges will be brought into engagement with its adjacent shell section, while the other thereof is still radially spaced from its adjacent shell section, whereby continued clamping action of the band on the coupling flanges will place the band under a torque strain that will tend to warp the band out of a normally flat plane and thereby exert additional yielding axial clamping pressure between the band and coupling flanges.

3. In an air cleaner, the combination with a casing formed of a cylindrical upper section and an oil well-forming lower section, said upper and lower cylindrical casing sections being provided with cooperating outstanding annular coupling flanges, of a cross-sectionally channel-shaped split clamping band comprising inwardly diverging annular band flanges forming opposite sides of a common channel and engaging opposite of said annular coupling flanges with a clamping action tending to draw the clamping flanges together, the coupling flange of one of said sections being of greater diameter than the coupling flange of the other section, and the axial opening through the band flange that engages the smallest diameter coupling flange being of greater diameter than the axial opening through the other of said band flanges, whereby the clamping band will remain locked against axial displacement in either direction from the larger diameter coupling flange when said band is opened sufficiently to permit axial displacement of the smaller diameter coupling flange from the channel of the clamping band.

4. In an air cleaner, the combination with a casing formed of a cylindrical upper section and an oil well-forming lower section, said upper and lower cylindrical casing sections being provided with cooperating outstanding annular coupling flanges, of a cross-sectionally channel-shaped split clamping band comprising inwardly diverging annular band flanges forming opposite sides of a common channel and engaging opposite of said annular coupling flanges with a clamping action tending to draw the clamping flanges together, the relation of the band flanges to their respective radially adjacent shell sections being such that, under clamping action of the band on the coupling flanges, one of the band flanges will be brought into engagement with its adjacent shell section, while the other thereof is still radially spaced from its adjacent shell section, whereby continued clamping action of the band on the coupling flanges will place the band under a torque strain that will tend to warp the band out of a normally flat plane and thereby exert additional yielding axial clamping pressure between the band and coupling flanges.

WILFRED W. LOWTHER.
FRED R. NOHAVEC.